April 28, 1925.
C. LAMB ET AL
1,536,025
PISTON SLEEVE
Filed Feb. 13, 1924 2 Sheets-Sheet 1
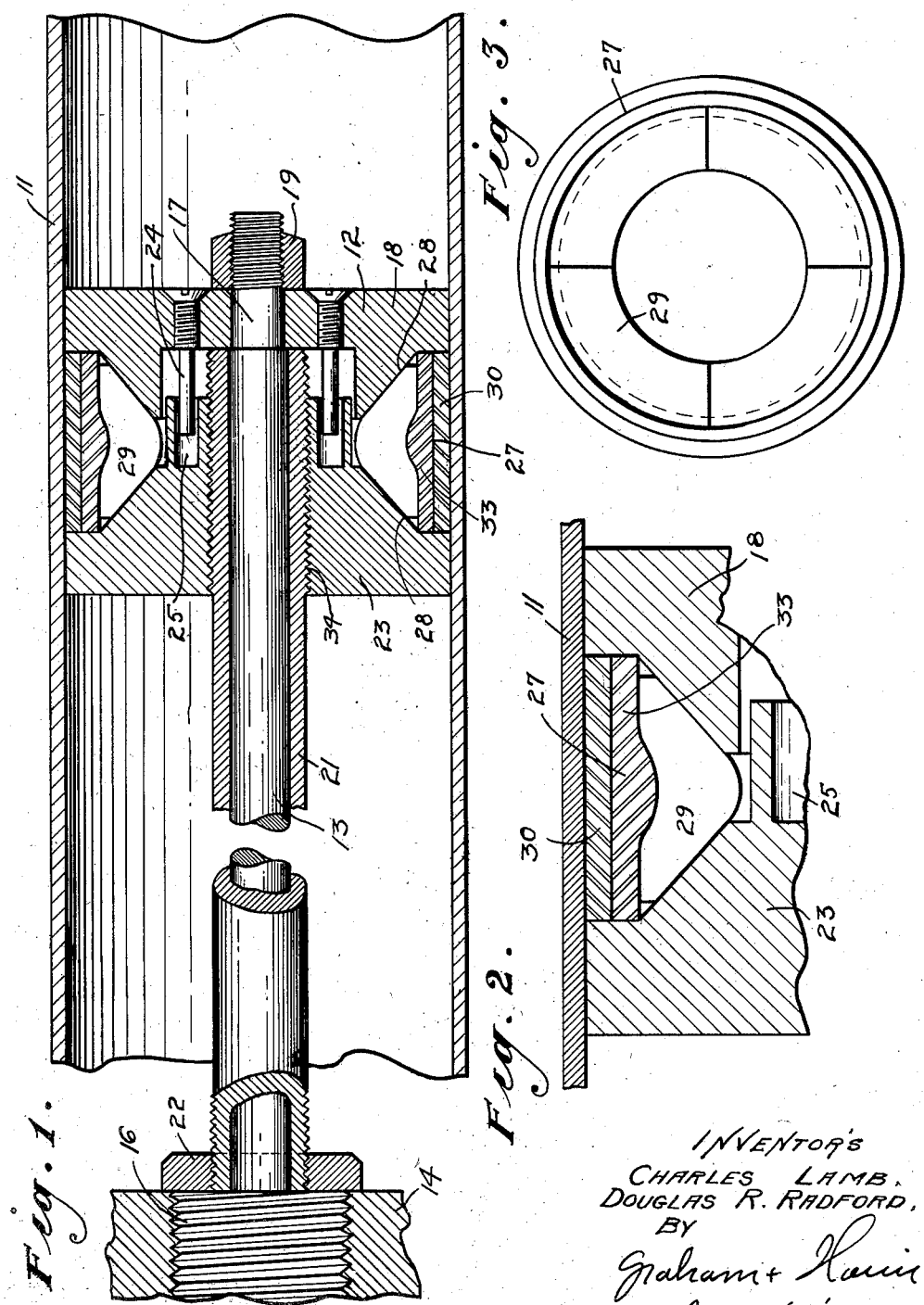
INVENTORS
CHARLES LAMB,
DOUGLAS R. RADFORD,
BY
Graham + Davis
ATTORNEYS.

April 28, 1925.
C. LAMB ET AL
1,536,025
PISTON SLEEVE
Filed Feb. 13, 1924
2 Sheets-Sheet 2
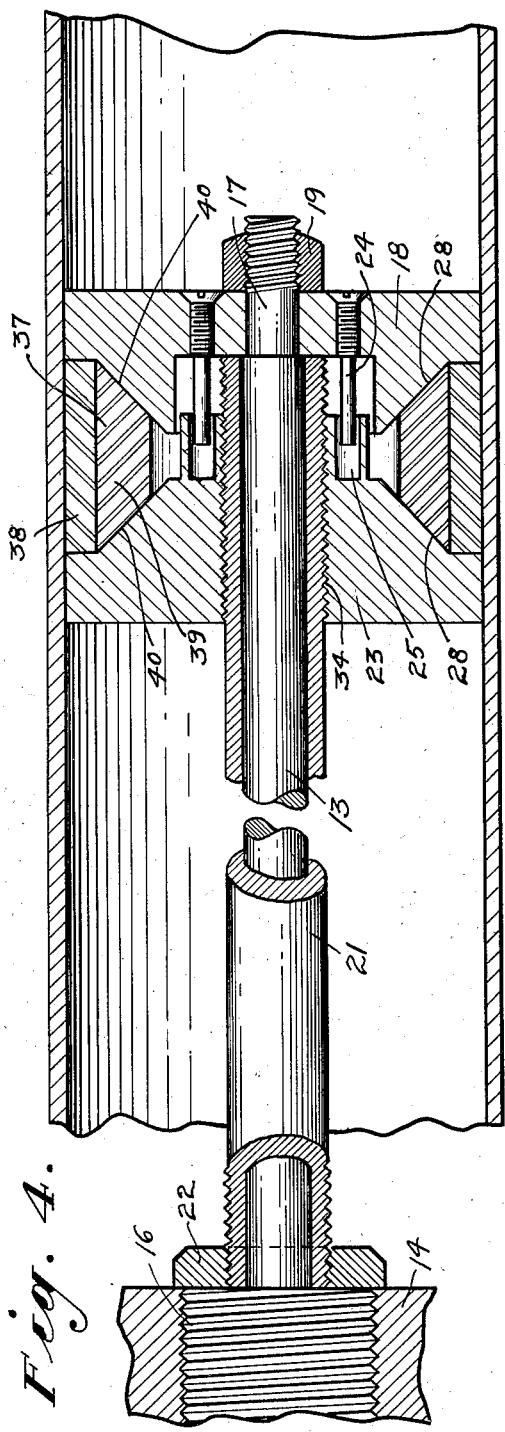
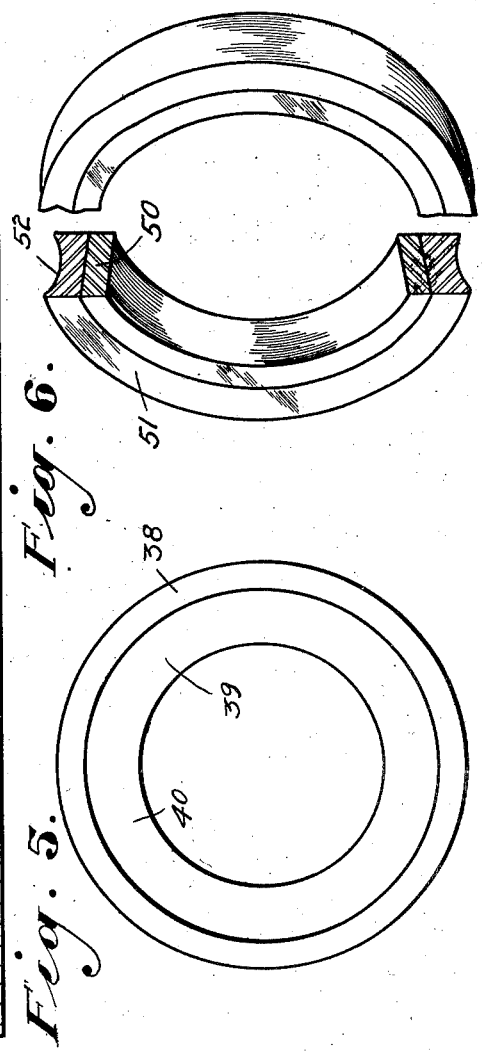
INVENTOR'S.
CHARLES LAMB,
DOUGLAS R. RADFORD,
BY
ATTORNEYS.

Patented Apr. 28, 1925.

1,536,025

UNITED STATES PATENT OFFICE.

CHARLES LAMB AND DOUGLAS R. RADFORD, OF LOS ANGELES, CALIFORNIA.

PISTON SLEEVE.

Application filed February 13, 1924. Serial No. 692,522.

*To all whom it may concern:*

Be it known that we, CHARLES LAMB and DOUGLAS R. RADFORD, both subjects of the King of Great Britain, residing at Los Angeles, in the county of Los Angeles, State of California, have invented a new and useful Piston Sleeve, of which the following is a specification.

This invention relates to pumping equipment and has its principal utility in pumps employed for transferring liquids containing abrasive substances.

In the drilling of wells by the rotary system, a thin mud is pumped through the string of drill pipe to the cutting tool for the purpose of mudding up the hole, lubricating the turning drill member, and for washing out the cuttings removed by the drill bit. Thus mud, although of very smooth consistency, when first made, soon picks up quantities of sharp sand and gravel, which has a very abrasive action on the pump parts and is productive of a very rapid wear. In order to preserve a tight seal between the pump cylinder and piston, expansive packing means are now employed, certain of these employing rubber composition sleeves which are mounted upon adjustable pistons whereby the sleeve may be compressed in the direction of its cylindrical axis and thus caused to expand radially against the cylinder wall. The consistency of the rubber employed in these sleeves has been the subject of much technical research. It is found that a hard rubber is scored and cut by sand and gravel particles and is thus soon disintegrated. Where sleeves of this character are employed, replacement is found necessary every eight to ten hours or in other words, a replacement is required for every drilling shift. Resilient pliable rubber is found to resist cutting and scoring quite successfully, but the use of this rubber has been prevented by the fact that there is a tendency for the sleeve to turn over or double up after it has become slightly worn, thus destroying the pumping action.

It is an object of our invention to provide a piston sleeve which will have great resistance against cutting and scoring and which may therefore be employed for relatively long periods of operation.

It is a further object of the invention to provide a piston sleeve having an outer layer of relatively pliable wear resisting rubber compound and an inner cylindrical reinforcing layer of a very rigid fibrous composition which will preserve the cylindrical form of the sleeve, but has sufficient expansive qualities to allow for adjustment of the sleeve by tightening up of the piston elements. The piston sleeve hereinafter described is found by actual field tests to have a very marked increase in wearing qualities as compared to the previously used piston sleeves, the particular advantage thereof being that tearing down of the pump for replacement is necessary at less frequent intervals, and proper operation of the pump during critical periods is assured.

The especial advantages and further objects of the invention will be made evident hereinafter.

Referring to the drawings which are for illustrative purposes only;

Fig. 1 shows a pump piston equipped with a piston sleeve embodying the features of our invention.

Fig. 2 is an enlarged fragmentary section of the pump piston.

Fig. 3 is an elevation of the piston sleeve and expanding segments.

Fig. 4 shows a piston equipped with another type of piston sleeve.

Fig. 5 is an elevation of the piston sleeve shown in Fig. 4.

Fig. 6 is another form of sleeve employing our invention.

In Figs. 1 and 2, 11 represents a pump cylinder in which a piston 12 is operated through a rod 13 which extends to a cross head 14 and threads thereinto as indicated at 16. On the inner reduced end 17 of the rod 13 a fixed piston member 18 is secured by a nut 19. On that portion of the rod 13, extending between the member 18 and the cross head 14 is placed the sleeve 21 having a lock nut 22 on the outer end thereof and a relatively movable piston element 23 threaded on the inner end thereof. The member 23 is prevented from rotation relative to the piston element 18 by pins 24 which extend into recesses 25. Between the members 18 and 23, a channel for receiving the piston sleeve 27 is formed, this channel having sloping walls 28 between which metal segments 29, generally four in number as shown in Fig. 3, are received. The piston sleeve 27 which is mounted upon the segments 29 is cylindrical in form and consists of an outer cylindrical layer 30 of a pliable, tenacious, wear resisting substance, such as may be produced in the compounding of rubber with other ingredients. Having these characteristics, this outer layer is not readily scored by abrasive materials and does not rapidly wear down. It is understood that alone this outer pliable layer would be valueless as a piston sleeve owing to the fact that when the piston moves, the friction on the walls causes a tendency for the sleeve to roll up in the annular sleeve channel of the piston. In order to employ the splendid wearing quality of a pliable material such as described, we use in association therewith a reinforcing means for preserving the cylindrical form of the piston sleeve; this reinforcing means, preferably a substantially cylindrical layer 33 of comparatively stiff or rigid rubber substance. As described in application for patent, filed March 26, 1923, Serial No. 627,753, the rubber substance we employ is compounded with fibrous material which gives the rubber substance marked rigidity, but leaves enough resilience to permit the expansion of the piston sleeve when the piston member 23 is advanced toward the piston member 18 by rotating the sleeve 21 on the rod 13, which produces a rotation of the threads 34 in the member 23 with the result of moving this member axially toward the member 18.

In Fig. 4, we employ a piston sleeve 37 consisting of an outer pliable wear resisting layer 38 of compounded rubber substance and an annular member 39 of rigid flexible rubber substance. The inner annular member or layer is relatively thick and has conical faces 40 which cooperate with the faces 28 of the piston members in such a manner that when these members are drawn together, the piston sleeve will be forced outwardly. The inner reinforcing layer 39 has the same action as the reinforcing layer 33 and effectually preserves the cylindrical form of the sleeve so that it cannot possibly roll up or turn over when the pump is in operation. Due to the great strength in the member 39, the sleeve may be used until the outer wear receiving layer is entirely worn down. A sleeve of this character has by actual test been found to operate through ten consecutive eight hour shifts, which will be recognized as a marked advance over the eight hour utility of the sleeve previously used on the pump in which the test was made.

The invention is also applied to the manufacture of sleeves of the character shown in Fig. 6, which are used in internal expansion pistons commonly known as the Green wood expanding piston. These sleeves are equipped with the customary inner reinforcing layer 50 of comparatively rigid rubber compounds, on which is mounted a pliable layer 51 having the outer face thereof concave in form as indicated at 52, this face flattening out under the internal expanding pressure employed in the piston.

There are various other devices partaking of the character of pistons, with which the invention may be employed. Such devices include a device termed "swab" which is slidably received in an oil well previous to production, and carries sleeves of this character.

We claim as our invention:

1. In a piston sleeve, the combination of: an outer cylindrical body of pliable wear resisting rubber substance; and an inner cylindrical body of flexible fibrous material of sufficient stiffness to hold said outer pliable body in cylindrical form.

2. In a piston sleeve, the combination of: an outer body of pliable wear-resisting rubber substance; and an inner body of flexible fibrous material to hold said outer pliable body in its proper form.

3. In a piston sleeve, the combination of: an outer body of pliable wear-resisting rubber substance; and an inner body of flexible fibrous material to hold said outer pliable body in its proper form, said outer body of pliable wear-resisting substance being vulcanized to said inner body of flexible fibrous material.

In testimony whereof, we have hereunto set our hands at Los Angeles, California, this 4th day of February, 1924.

CHARLES LAMB.
DOUGLAS R. RADFORD.